Sept. 26, 1944.  D. N. DAVIES  2,358,963
THERMOPLASTIC COMPOSITION AND METHOD OF PRODUCING THE SAME
Filed Oct. 23, 1939
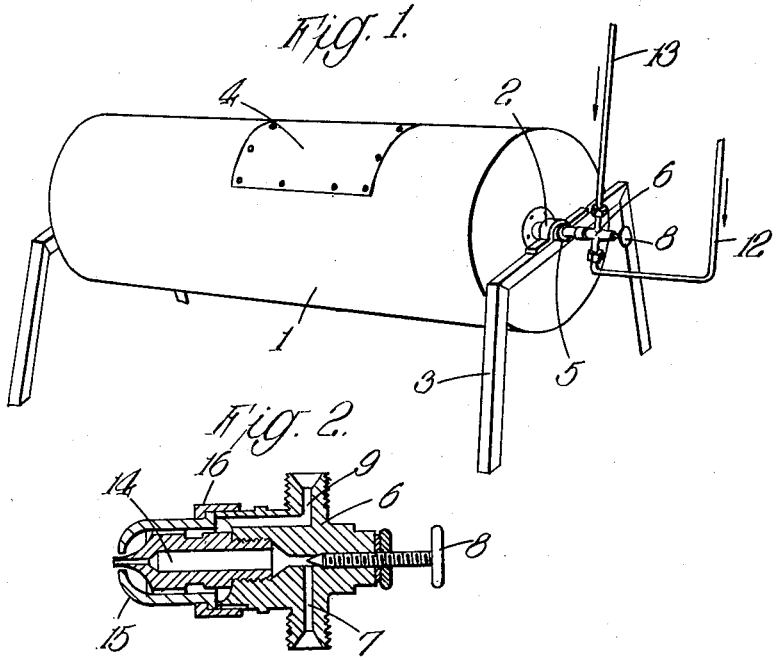
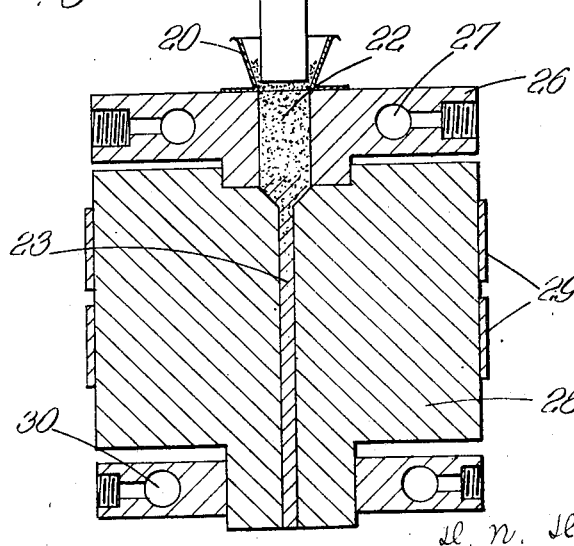
Inventor
D. N. Davies
by Young Emery & Thompson
attys.

Patented Sept. 26, 1944

2,358,963

UNITED STATES PATENT OFFICE 2,358,963

THERMOPLASTIC COMPOSITIONS AND METHOD OF PRODUCING THE SAME

Drury Norman Davies, Ashford, England, assignor to Cellomold Limited, Feltham, Middlesex, England, a British company Application October 23, 1939, Serial No. 300,895
In Great Britain June 19, 1939

5 Claims. (Cl. 106—196)

This invention relates only to thermoplastic materials or compositions capable of being molded by extrusion, i. e. synthetic resins which soften when heated and become rigid again on cooling whilst still being capable of being again softened by heating, and more particularly to thermoplastic materials such as the plastics known by the registered trade-marks "Cellomoid," "Trolitul" and "Mipolam" which have a base of cellulose acetate, polystyrene, and polyvinyl ester, respectively; and other thermoplastics such as polymers of the acrylic ester type. The thermoplastic may, however, have natural resins, fillers, dyes, plasticisers or other ingredients incorporated therein.

Extrusion of thermosetting resinous compositions has been carried out successfully, but production with thermoplastic resins has not proved entirely satisfactory because the extruded profiles have been somewhat deformed, and the surface has been dull and has had an undulating appearance, and dimensional tolerances of the order of ±5% have consequently been required and subsequent finishing operations have been necessary. Seizing of the material in the die is also a difficulty not easily overcome and accordingly it has been necessary to maintain the material hot or at least warm and somewhat plastic until it has left the die. Unavoidable changes in the dimensions of the extrusions occurred as the material left the die because of the sudden removal of the compressing forces from the still plastic material. Poor surfaces and alteration of dimensions also occur because of the cooling taking place outside the die. The solidification of the material before it left the die was not possible (as with thermosetting resins) because of seizing in the die. The incorporation of lubricants, solvents and plasticisers in the material did not solve the problem.

The present invention enables a much higher degree of dimensional accuracy and a much higher polish to be achieved than has hitherto been possible for extruded tubes and other sections of thermoplastic materials.

By means of the present invention extrusions can be made to a dimensional tolerance within ±0.5%, and the extrusions can be substantially straight, free from waviness and other irregularities, and possess a very high polish requiring no after treatment and without seizing of the material in the die or requiring unduly heavy extruding pressures.

According to the present invention the dry thermoplastic substance in the form of small pieces or powder has a lubricant dispersed throughout the mass of particles, coming in contact only with the surfaces of the dry particles, i. e. without being dispersed throughout the substance of each individual particle. The lubricant must therefore be applied to the thermoplastic whilst the latter is in solid or dry state, and this can be effected by mixing the lubricant in the form of a powder or spray with the thermoplastic whilst the latter is in the form of a powder or small pieces or flakes. Alternatively, sheets of thermoplastic material may be sprayed with a solution of a lubricant, the solvent evaporated, and the sheets comminuted into powder or small pieces, so that the lubricant adheres to the surface of the particles of the thermoplastic. Lubricants do not soak through the particles as do solvents and plasticisers, and thus contact only the outer surfaces of the particles. The thermoplastic substance must be maintained in solid or dry state and not made plastic by heating or otherwise whilst the lubricant is being mixed therewith, nor afterwards until extrusion is effected. It is a surprising fact that the lubricant is more effective if added in small quantities than if larger quantities are used. We have found that 0.1–0.5% lubricant by weight of the total composition gives good results, and not more than 1.5% should be used. Greater quantities of lubricant often fail to give satisfactory results. The lubricant may, for example, be olein, stearine or compounds thereof, or a wax known as "O. P. flakes" sold by I. G. Farbenindustrie Aktiengesellschaft. The die may consist of an elongated die chamber, the inner cross-sectional dimensions of which are uniform over a length of from 3 to 36 inches providing a bore shaped to the profile required in the finished extruded section. The inlet end of the chamber is enlarged to form a ram chamber having a cross-sectional area between 2 and 8 times that of the cross-section of the finished extrusion. The die has a short tapered part connecting the die chamber to the ram chamber. A reciprocating ram enters the ram chamber taking with it a charge of the material. The ram chamber may be cooled by circulation of water. The material then enters the tapered zone, which is heated, and flows forwards into the die chamber where it is submitted for some distance to heat. The die chamber is cooled at and adjacent to its outlet end for a distance sufficient to ensure that the material extrudes in solid form and is also solid for some distance in the die chamber to form a plug having frictional engagement with the walls of the die chamber so that the heated material is submitted to pressure.

Apparatus for use in carrying out the invention is illustrated by way of example in the accompanying diagrammatic drawing in which Figure 1 is a perspective view of a mixing apparatus;

Figure 2 is an enlarged sectional view of the spraying device shown in Figure 1; and Figure 3 is a sectional view of an extrusion apparatus.

In the apparatus shown in Figures 1 and 2 a rotary drum 1 is mounted in suitable bearings 2 carried by supports 3 and is rotated by any suitable means not shown. The thermoplastic material is introduced into the drum through an opening which is thereafter closed by a closure plate 4. One end of the drum is mounted on a hollow spindle 5 through which lubricant is introduced as a powder or liquid spray by a spraying device comprising a valve body 6 having a lubricant inlet conduit 7 which can be opened or closed by a needle valve 8 and a compressed air inlet conduit 9. The conduit 7 is connected to an inlet pipe 12 which communicates with any suitable source of lubricant supply not shown. Similarly the air conduit 9 is connected with a compressed air line 13. A lubricant nozzle 14 and a compressed air nozzle 15 are attached to the valve body by a nut 16. The compressed air passes through openings between the nozzles 14, 15, and draws lubricant through the nozzle 14 from the conduit 7 and pipe 12 and injects this lubricant into the drum 1 where it coats the small pieces or particles of the thermoplastic material which is being tumbled by the rotary action in the drum.

In the apparatus shown in Figure 2 the thermoplastic material connected with lubricant is fed into a hopper 20 whence it is pressed by a reciprocating ram 21 into a compressing chamber 22 from which the material passes into a die chamber 23 which has the required shaped cross section for a distance of at least several inches in length. The chamber 22 is formed in a casting 26 which has a chamber 27 in which a cooling medium is circulated. The die chamber 23 is formed in a block 28 the main part of which is heated by electrical heating devices 29. The block 28 at the outlet end of the die chamber 23 is cooled by circulating a cooling medium through a jacket 30 to such an extent that the material emerges in a sufficiently solid state to ensure its maintaining its shape. The cooling is effected for a distance to ensure that the extruding material is solid for a sufficient length in the die chamber 23 to provide the required back pressure by friction for compression of the material.

I claim:

1. A method of producing an extrusion plastic which comprises forming a sheet of a thermoplastic material, applying to the sheet a solution of a lubricant, in a solvent which is not a solvent for said material, evaporating the solvent, and disintegrating the material in the cold into separate particles.

2. A method of producing an extrusion plastic which comprises forming a sheet of thermoplastic material, applying to the sheet a solution of a lubricant, in a solvent which is not a solvent for said material whereby the lubricant, amounting to less than 1.5% of the weight of the total composition, is applied to the sheet, evaporating the solvent and disintegrating the material in the cold into separate particles.

3. A composition of matter comprising a solid thermoplastic substance consisting mainly of cellulose acetate and in the form of numerous separate particles having a quantity of a lubricant not exceeding 0.5 per cent by weight of the total composition, dispersed in the form of a powder throughout the particles in contact only with the surfaces of the solid particles, i. e. without being incorporated throughout the substance of each individual particle.

4. A composition of matter comprising a solid thermoplastic substance consisting mainly of cellulose acetate and in the form of numerous separate particles having a quantity of lubricant not exceeding 0.5 per cent by weight of the total composition, dispersed throughout the particles in contact only with the surfaces of the solid particles, i. e. without being incorporated throughout the substance of each individual particle.

5. A composition of matter comprising a solid thermoplastic substance consisting mainly of cellulose acetate and in the form of numerous separate particles having a quantity of a lubricant not exceeding 0.5 per cent by weight of the total composition, dispersed throughout the particles in the form of a sprayed coating on the surfaces only of the solid particles, i. e. without being incorporated throughout the substance of each individual particle.

DRURY N. DAVIES.